US011169755B2

(12) United States Patent
Mihira

(10) Patent No.: US 11,169,755 B2
(45) Date of Patent: Nov. 9, 2021

(54) INFORMATION PROCESSING SYSTEM, IMAGE FORMING APPARATUS, TERMINAL, INFORMATION PROCESSING METHOD, AND STORAGE MEDIUM

(71) Applicant: CANON KABUSHIKI KAISHA, Tokyo (JP)

(72) Inventor: Yoshiro Mihira, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/599,006

(22) Filed: Oct. 10, 2019

(65) Prior Publication Data

US 2020/0125305 A1 Apr. 23, 2020

(30) Foreign Application Priority Data

Oct. 17, 2018 (JP) .............................. JP2018-196233

(51) Int. Cl.
*G06F 3/12* (2006.01)
*H04L 29/08* (2006.01)

(52) U.S. Cl.
CPC .......... *G06F 3/1253* (2013.01); *G06F 3/1205* (2013.01); *G06F 3/1292* (2013.01); *H04L 67/02* (2013.01)

(58) Field of Classification Search
CPC .... G06F 3/1253; G06F 3/1292; G06F 3/1205; H04L 67/02
See application file for complete search history.

(56) References Cited

U.S. PATENT DOCUMENTS

| | | | | |
|---|---|---|---|---|
| 2008/0120570 A1* | 5/2008 | Adams | .................... | G06F 9/452 |
| | | | | 715/804 |
| 2009/0313541 A1* | 12/2009 | Dan | ....................... | G06F 3/1207 |
| | | | | 715/273 |
| 2011/0019242 A1* | 1/2011 | Tajima | ............... | H04N 1/00225 |
| | | | | 358/442 |
| 2012/0030585 A1* | 2/2012 | Akuzawa | ........... | H04N 1/00222 |
| | | | | 715/747 |
| 2012/0233538 A1* | 9/2012 | Negoro | ............. | H04N 1/00506 |
| | | | | 715/234 |
| 2017/0264775 A1* | 9/2017 | Ikeda | .................. | H04N 1/00482 |
| 2018/0121044 A1* | 5/2018 | Watkins | .................. | G06F 8/315 |

FOREIGN PATENT DOCUMENTS

JP 2016-057697 A 4/2016

\* cited by examiner

*Primary Examiner* — Huo Long Chen
(74) *Attorney, Agent, or Firm* — Canon U.S.A., Inc. IP Division

(57) ABSTRACT

When providing a web page for receiving a setting to a mobile terminal, an image forming apparatus includes, in the web page, information storable as a custom setting in the terminal in a format such as a uniform resource locator (URL). The mobile terminal stores the provided information included in the web page as a custom setting so that the stored custom setting can be reused with ease.

12 Claims, 12 Drawing Sheets

SCREEN DISPLAYED WHEN APPLICATION FOR IMAGE FORMING APPARATUS A IS ACTIVATED

DEFAULT COPY SCREEN FOR IMAGE FORMING APPARATUS A

COPY SCREEN FOR IMAGE FORMING APPARATUS A AFTER SETTING

SCREEN FOR ADDING CUSTOM SETTING

SELECT CUSTOM SETTING

IMAGE FORMING APPARATUS B SELECTED

DEFAULT COPY SCREEN FOR IMAGE FORMING APPARATUS B

SCREEN FOR IMAGE FORMING APPARATUS B AFTER CUSTOM SETTING IS SELECTED

SCREEN FOR BLACK/WHITE IMAGE FORMING
APPARATUS C AFTER CUSTOM SETTING IS SELECTED

FIG.10

```
<script>
var customSettings ='{
    "func": "Copy",
    "settings": {
        "size": "A4",
        "2side": "yes",
        "Color": "Auto"
    },
    "Name": "AUTO-COLOR AND TWO-SIDED"
}';
</script>
```

INFORMATION PROCESSING SYSTEM, IMAGE FORMING APPARATUS, TERMINAL, INFORMATION PROCESSING METHOD, AND STORAGE MEDIUM

BACKGROUND

Field of the Disclosure

The present disclosure relates to an information processing system for configuring a setting of an image forming apparatus from a mobile terminal.

Description of the Related Art

An image forming apparatus such as a multi-function peripheral (MFP) or printer is capable of receiving a user operation via an operation unit such as a touch panel when performing printing, copying, or scanning. Further, mobile terminals are widely used in recent years, and it has become possible to use a mobile terminal as an operation unit of an image forming apparatus.

In a method for performing a setting operation on an image forming apparatus from a mobile terminal, the image forming apparatus functions as a web server, and a web page (e.g., data in Hypertext Markup Language (HTML) format) for configuring a setting of the image forming apparatus is displayed on the mobile terminal in order to perform a setting operation via the web page.

Meanwhile, there is a method in which a frequently-used setting is registered as a custom setting in an operation unit of an image forming apparatus and the registered custom setting is invoked and used as needed. Japanese Patent Application Laid-Open No. 2016-57697 discusses a method in which a custom setting set on an image forming apparatus is synchronized with another image forming apparatus on a network using a Server.

The technique discussed in Japanese Patent Application Laid-Open No, 2016-57697, however, requires a separate server for synchronizing a custom setting of an image forming apparatus in a case where the custom setting is to be shared by a plurality of image forming apparatuses.

SUMMARY

According to embodiments of the present disclosure, a system includes devices that include an image forming apparatus and a terminal, wherein the image forming apparatus includes a first memory, and a first processor in communication with the first memory, wherein the first processor is configured to perform providing the terminal with a first web page for receiving a setting of a predetermined function of the image forming apparatus, receiving a first setting of the predetermined function designated by a user on the terminal, generating a second web page based on the received first setting, and providing the terminal with information about the second web page, the provided information about the second web page containing information about the received first setting, wherein the terminal includes a second memory, and a second processor in communication with the second memory, wherein the second processor is configured to perform displaying the provided first web page, transmitting, to the image forming apparatus, the first setting of the predetermined function designated by the user via the displayed first web page, storing the information about the first setting that is contained in the provided information about the second web page, generating, using the stored information about the first setting, information for requesting another image forming apparatus to apply the first setting, and accessing, using the generated information, a web page that is provided by the other image forming apparatus and reflects the first setting.

Further features of the present disclosure will become apparent from the following description of exemplary embodiments with reference to the attached drawings.

BRIEF DESCRIPTION OF THE DRAWINGS

FIG. 10 illustrates an example of a description in JavaScript Object Notation (JSON) format in a case of storing a custom setting in Hyper Text Markup Language (HTML) data.

DESCRIPTION OF THE EMBODIMENTS

Various exemplary embodiments of the present disclosure will be described below with reference to the drawings. It should be noted, however, that the below-described embodiments are not seen to be limited and that not every combination of features described in the exemplary embodiments is necessarily deemed to be essential. While a web page is described as data (Hypertext Markup Language (HTML) file) described in HTML format in the below-described exemplary embodiments, the data format is not limited to the HTML format.

Figure 1:
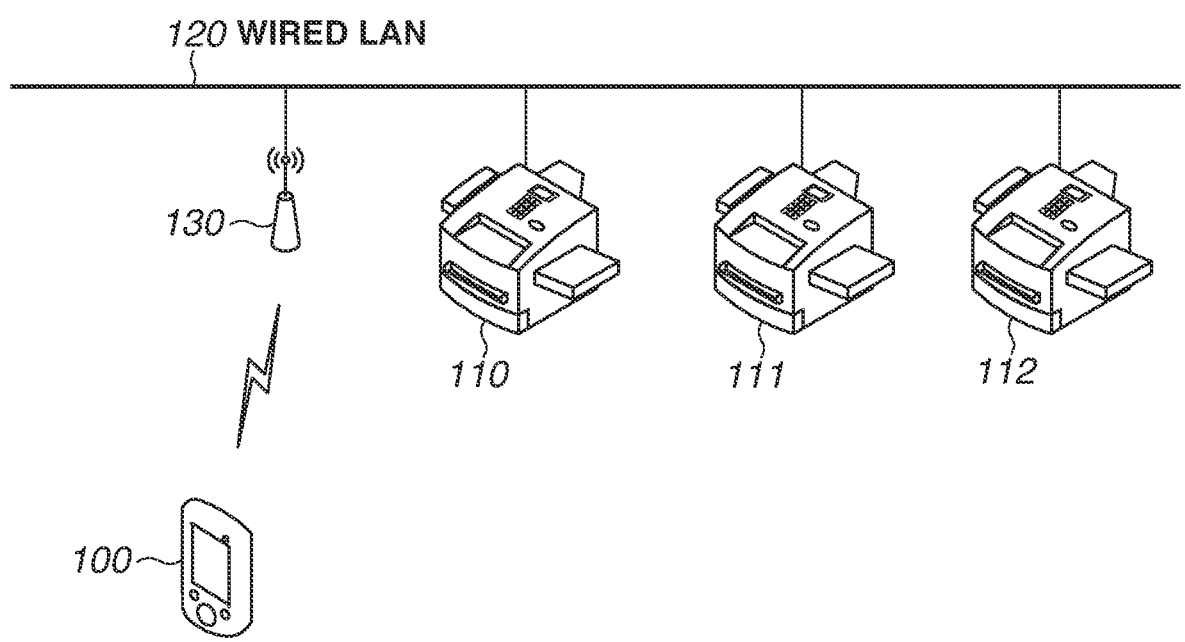
FIG. 1 illustrates an example of a configuration of an information processing system.

First, a configuration of an information processing system according to a first exemplary embodiment will be described with reference to FIG. 1. The information processing system according to the present exemplary embodiment includes a mobile terminal 100, image forming apparatuses 110, 111, and 112, a wired local area network (LAN) 120, and a wireless access point 130. The image forming apparatuses 110 and 111 include a color print function, whereas the image forming apparatus 112 does not include a color print function but includes a black/white print function. Further, the image forming apparatuses 110, 111, and 112 include a scanner function of reading a document and generating a document image. The image forming apparatuses 110, 111, and 112 are connected to the wireless access point 130 via the wired LAN 120 using a LAN cable.

The mobile terminal 100 includes a wireless communication function such as a Wi-Fi function and can connect to the wireless access point 130. Further, the mobile terminal 100 can transmit a search packet via wireless communication and find the image forming apparatuses 110, 111, and 112 located on the wired network via the wireless access point 130. The mobile terminal 100 can transmit a print job to a desired image forming apparatus via the wireless access point 130 to instruct the desired image forming apparatus to execute a print function or can instruct a desired image forming apparatus to execute a function such as a copy function or send function. The print function is a function of printing based on a received print job. The copy function is a function of printing an image acquired by scanning a document. The send function is a function of externally transmitting, via a network, an image acquired by scanning a document. An image forming apparatus having received an instruction from the mobile terminal 100 executes processing corresponding to the instruction.

Figure 2:
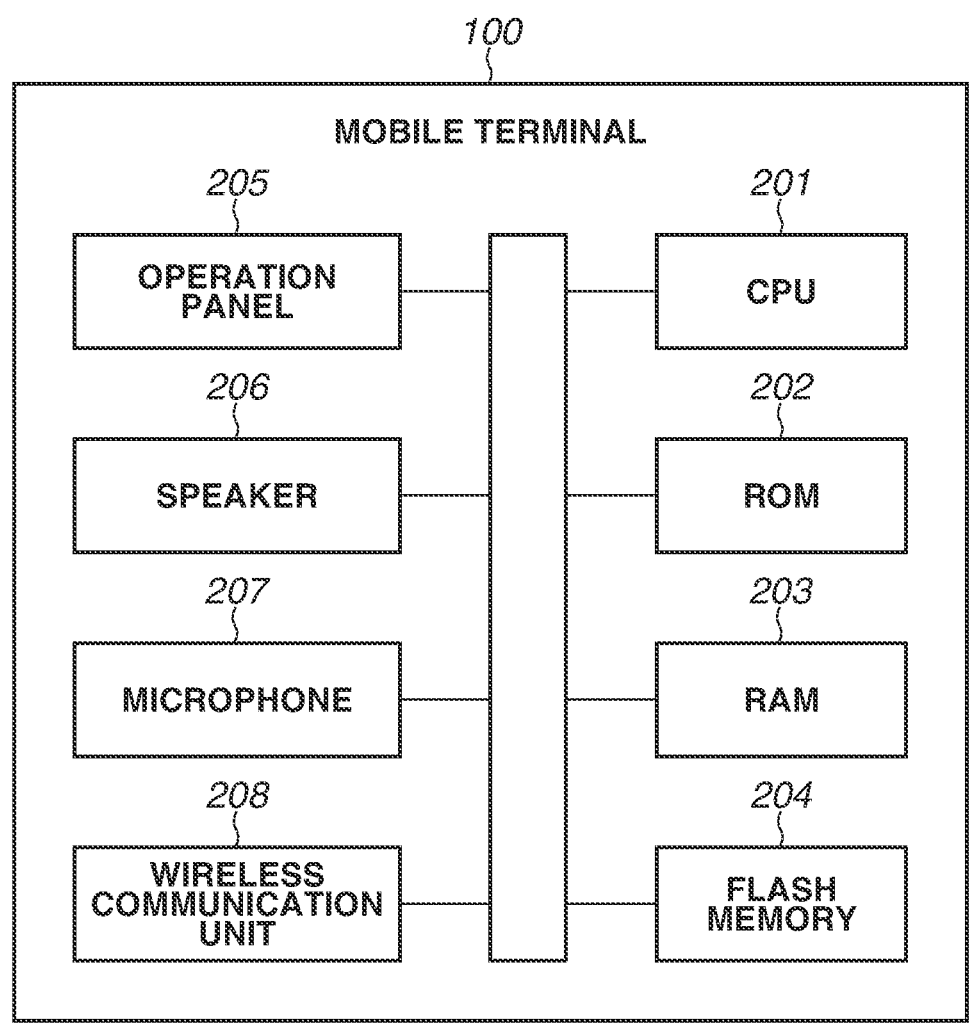
FIG. 2 illustrates a hardware configuration of a mobile terminal.

Next, a hardware configuration of the mobile terminal 100 will be described below with reference to FIG. 2. While the mobile terminal 100 according to the present exemplary embodiment is an apparatus such as a smartphone or tablet personal computer (PC), the mobile terminal 100 can be any other information processing apparatus capable of executing an application.

A central processing unit (CPU) 201 reads a control program stored in a read-only memory (ROM) 202 and executes the read control program to thereby control the operation of the mobile terminal 100. The ROM 202 stores a computer-executable control program (operating system (OS) 302 and an application 301 for an image forming apparatus which will be described below). A random access memory (RAM) 203 is used as a temporary storage area such as a main memory of the CPU 201 or work area. A flash memory 204 stores various types of data such as a picture and an electronic document. The control program can be stored in the flash memory 204 instead of the ROM 202.

In the case of the mobile terminal 100, the single CPU 201 executes a process illustrated in a flowchart described below, but any other configuration can be employed. For example, a plurality of CPUs can cooperate to execute a process illustrated in a flowchart described below.

An operation panel 205 includes a touch panel function capable of detecting a user touch operation and displays various screens provided by the OS 302 or an application. A user puts a touch operation to the operation panel 205 to thereby input a desired operation instruction to the mobile terminal 100. The mobile terminal 100 includes a hardware key (not illustrated), and a user can use the hardware key to input an operation instruction to the mobile terminal 100.

A speaker 206 and a microphone 207 are used when a user calls another mobile terminal or a fixed-line telephone.

A wireless communication unit 208 executes wireless communication such as Wi-Fi communication. The mobile terminal 100 transmits a search packet from the wireless communication unit 208 to thereby search for and find the image forming apparatuses 110, 111, and 112 with which the mobile terminal 100 can communicate via the wireless access point 130 or wireless direct connection 113. The wireless communication method is not limited to the Wi-Fi method and can be any other wireless communication method.

Figure 3:
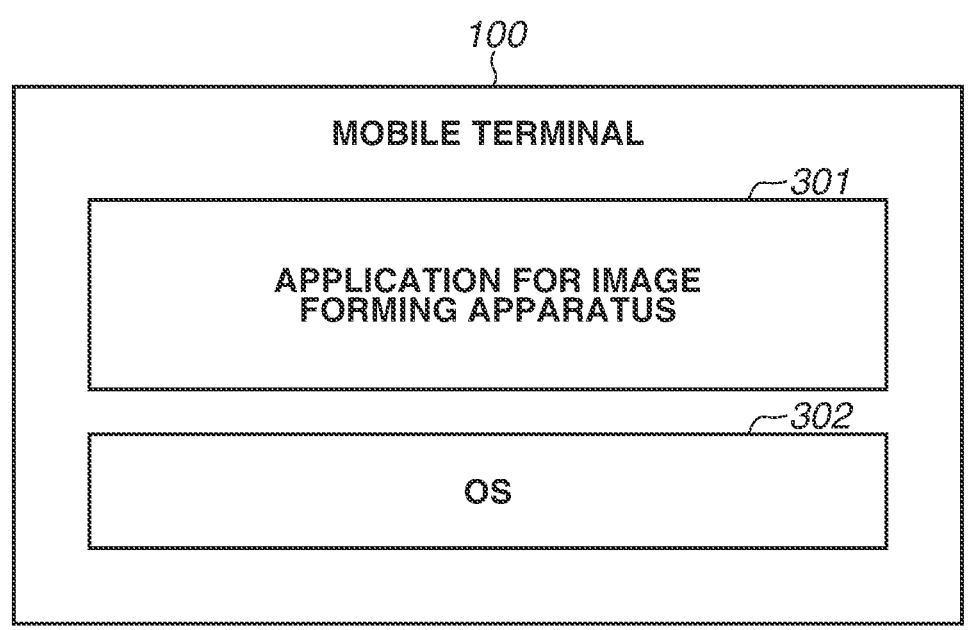
FIG. 3 illustrates a software configuration of the mobile terminal.

Next, a software configuration of the mobile terminal 100 will be described below with reference to FIG. 3. FIG. 3 is a function block diagram illustrating software that is realized by the CPU 201 by reading the control program stored in the ROM 202 or the flash memory 204 and executing the read control program.

The OS 302 is software for controlling the entire operation of the mobile terminal 100. Various applications including the application 301 described below can be installed in the mobile terminal 100. The OS 302 exchanges information with the installed applications and changes a screen displayed on the operation panel 205 according to an instruction received from the applications. The OS 302 further executes wireless communication using the wireless communication unit 208.

The application 301 is an application installed in the mobile terminal 100. The application 301 searches for an image forming apparatus using the wireless communication unit 208 and connects to the image forming apparatus 110, 111, or 112 to execute print processing. The application 301 further includes a function of displaying a web page (HTML file) received from the image forming apparatus 110, 111, or 112, and if a user operation is performed on the displayed web page, the application 301 transmits details of the user operation to the image forming apparatus 110, 111, or 112 using the Hypertext Transfer Protocol (HTTP) and issues an instruction to execute processing corresponding to the details of the user operation.

Figure 4:
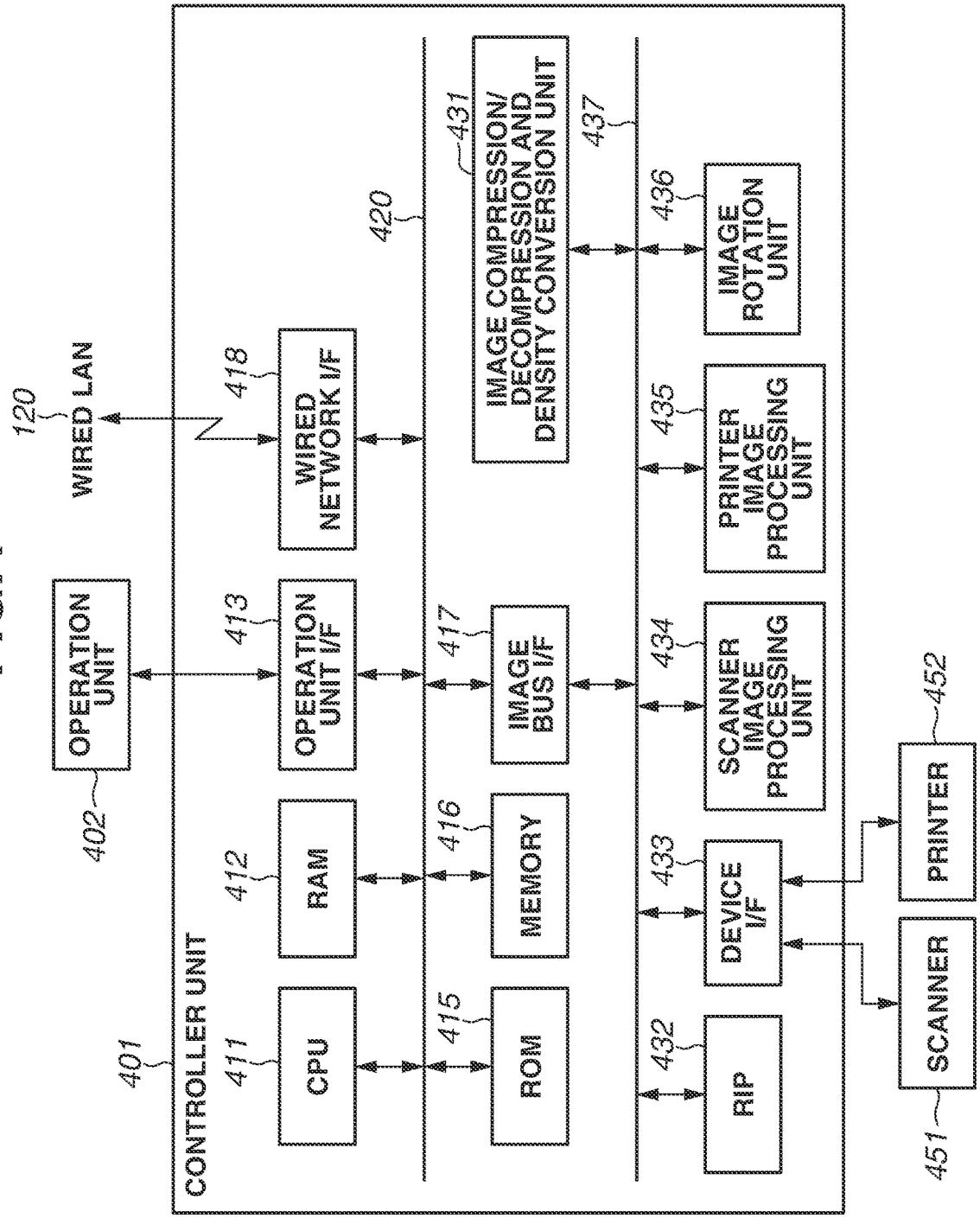
FIG. 4 illustrates a hardware configuration of an image forming apparatus.

Various other applications are also installed in the mobile terminal 100 besides the application 301, but description thereof is omitted, FIG. 4 illustrates a hardware configuration of the image forming apparatuses 110, 111, and 112. A controller unit 401 of the image forming apparatuses 110, 111, and 112 connects to a scanner 451 and a printer 452. The scanner 451 is an image input device configured to read a sheet document and input image data. The printer 452 is an image output device configured to perform printing. Further, the controller unit 401 communicates with the mobile terminal 100 illustrated in FIG. 1 via the wireless access point 130.

A CPU 411 controls an entire system in the image forming apparatuses 110, 111, and 112. A RAM 412 is a system work memory for the CPU 411 to operate and is also an image memory for temporarily storing image data. A ROM 415 is a boot ROM and stores a system hoot program for the image forming apparatus 110. A memory 416 stores system software illustrated in FIG. 5, application software, and image data. Further, the memory 416 also stores a print job received from the mobile terminal 100.

An operation unit interface (I/F) 413 is an interface unit for an operation unit 402 and outputs image data to be displayed on the operation unit 402 to the operation unit 402. Further, the operation unit I/F 413 includes a function of transmitting, to the CPU 411, information (operation details) input by a user via the operation unit 402.

A wired network I/F 418 is connected to the wired LAN 120. The controller unit 401 transmits and receives information to and from the mobile terminal 100 via the wired network I/F 418, the wired LAN 120, and the wireless access point 130.

An image bus I/F 417 is a bus bridge configured to convert a data configuration and is connected to a system bus 420 and an image bus 437 configured to transfer image data at high speed. The image bus 437 includes a peripheral component interconnect (PCI) bus or Institute of Electrical and Electronics Engineers (IEEE) 1394 bus. On the image bus 437 are provided a raster image processor (RIP) 432, a device I/F 433, a scanner image processing unit 434, a printer image processing unit 435, an image rotation unit 436, and an image compression/decompression and density conversion unit 431.

The RIP 432 converts a page description language (PDL) code into a bitmap image. The device I/F 433 connects a scanner 451 and a printer 452 to the controller unit 401. The scanner image processing unit 434 corrects, processes, and edits image data input from the scanner 451. The printer image processing unit 435 performs print correction and resolution conversion on image data to be output to the printer 452. The image rotation unit 436 rotates image data. The image compression/decompression and density conversion unit 431 converts multivalued image data into Joint Photographic Experts Group (JPEG) data and performs Joint Bi-level Image Experts Group (JBIG), Modified Modified Read (MMR), or Modified Huffman (MH) compression/decompression processing on binary image data.

Figure 5:
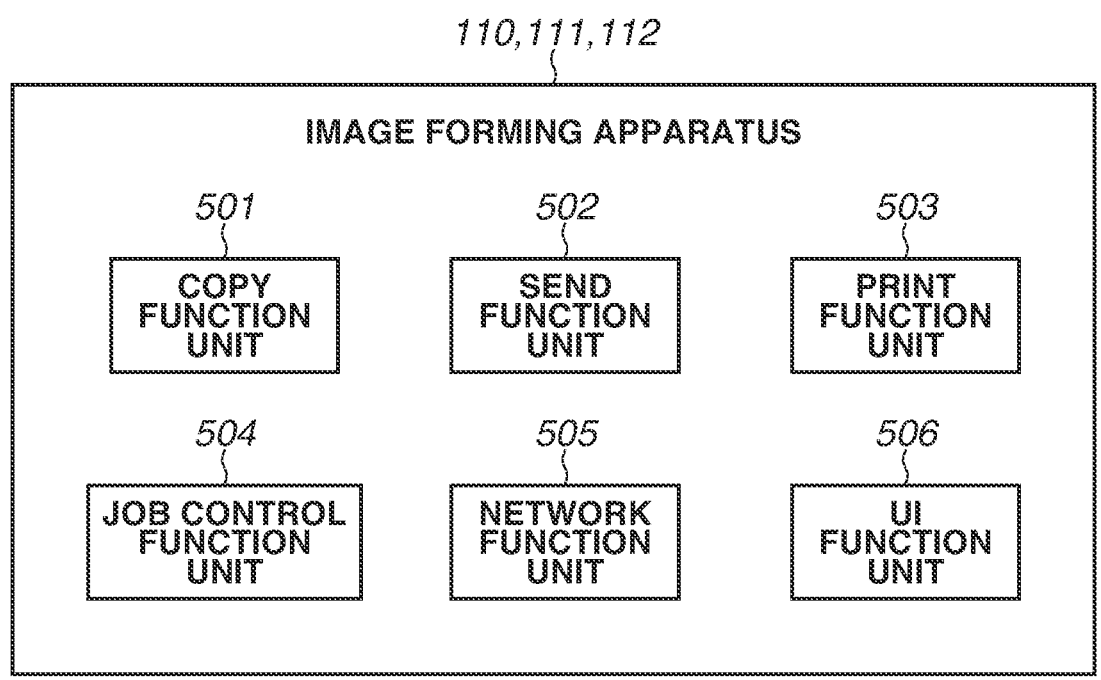
FIG. 5 is a function block diagram illustrating the image forming apparatus.

FIG. 5 is a function block diagram illustrating functions of the image forming apparatuses 110, 111, and 112 to which the present exemplary embodiment is applicable, and the CPU 411 of the controller unit 401 of the image forming apparatuses 110, 111, and 112 executes a control program stored in the memory 416 and cooperates with the operation unit 402, the scantier 451, or the printer 452 to realize the functions.

A copy function unit 501 reads a sheet document using the scanner 451, performs image processing such as two-sided or two-up image processing according to a user setting, and forming an image on a sheet using the printer 452 based on an image of the read sheet document.

A send function unit 502 includes a function of reading a sheet document using the scanner 451, converting the read document into binary or multivalued image data, and transmitting the image data to a user-designated destination.

A print function unit 503 includes a function of converting a print job received by a network function unit 505 into image data, adding a print command to the image data, and outputting the image data with the command to the printer 452 to execute print processing.

A job control function unit 504 queues image data received from the copy function unit 501 or the send function unit 502 as a job. Then, the job control function unit 504 sequentially outputs the image data to the print function unit 503 or the network function unit 505 described below.

The network function unit 505 includes a function of transmitting and receiving data using various network protocols such as Transmission Control Protocol over Internet Protocol (TCP/IP), HTTP, File Transfer Protocol (FTP), Lightweight Directory Access Protocol (LDAP), Simple Network Management Protocol (SNMP), Simple Mail Transfer Protocol (SMTP), Secure Sockets Layer (SSL), and Server Message Block (SMB). For example, the network function unit 505 can receive a print job and an operation instruction from the mobile terminal 100 via the wired LAN 120.

A user interface (UI) function unit 506 determines details of a user operation performed on the operation unit 402 of the image forming apparatus 110. Further, the UI function unit 506 provides a copy or send operation screen as data in HTML format (HTML data) to the mobile terminal 100 via the network function unit 505, receives a user operation instruction input to the mobile terminal 100, and notifies another function unit of the received user operation instruction. Then, the UI function unit 506 converts a message for the user of the mobile terminal 100 from the other function units into data in HTML format and transmits the converted data to the mobile terminal 100.

FIGS. 6A to 6I illustrate a display example of the operation panel 205 of the mobile terminal 100. Each screen is generated by the CPU 201 by executing the application 301 and interpreting HTML data.

Figure 6A:
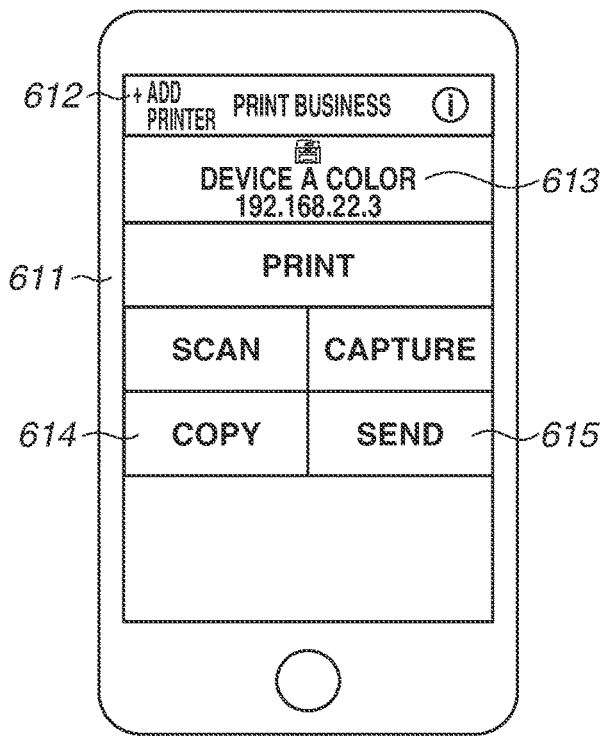
FIGS. 6A to 6I illustrate a display example of an operation panel of a mobile terminal according to a first exemplary embodiment.

FIG. 6A illustrates a basic screen 611 displayed when the application 301 is activated. Information about the image forming apparatus 110 which is currently selected as a cooperation target is displayed in a selected image forming apparatus display region 613. In the example illustrated in FIG. 6A, the name "DEVICE A COLOR" and the IP address "192.168.22.3" of the image forming apparatus 110 are displayed. If, for example, a user presses a "COPY" button 614 on the screen, the mobile terminal 100 accesses the image forming apparatus 110 using the IP address (or URL) of the image forming apparatus 110 displayed in the selected image forming apparatus display region 613 and receives a web page (HTML file) for configuring a setting of the copy function from the image forming apparatus 110. The mobile terminal 100 displays, based on the received web page, a screen (e.g., copy setting screen as illustrated in FIG. 6B) for configuring a setting of the copy function.

Further, if an "ADD PRINTER" button 612 illustrated in FIG. 6A is pressed, the mobile terminal 100 changes the displayed screen to a screen (not illustrated) for searching for an image forming apparatus and selecting and adding an image forming apparatus. On this screen, a broadcast packet is transmitted using the wireless communication unit 208 to search for an image forming apparatus on the wired LAN 120 that is connected via the wireless access point 130, and a user-designated image forming apparatus can be selected from the search result. If the user-designated image forming apparatus is selected, the selected image forming apparatus display region 613 is changed to display information about the selected image forming apparatus. For example, FIG. 6F illustrates a case where the image forming apparatus 111 is selected, and the name is changed to the name "DEVICE B COLOR" of the image forming apparatus 111 and the IP address is also changed to "192.168.22.13". Further, in a case where the image forming apparatus 112 is selected, a selected image forming apparatus display region is displayed as illustrated in FIG. 6I.

Figure 6B:
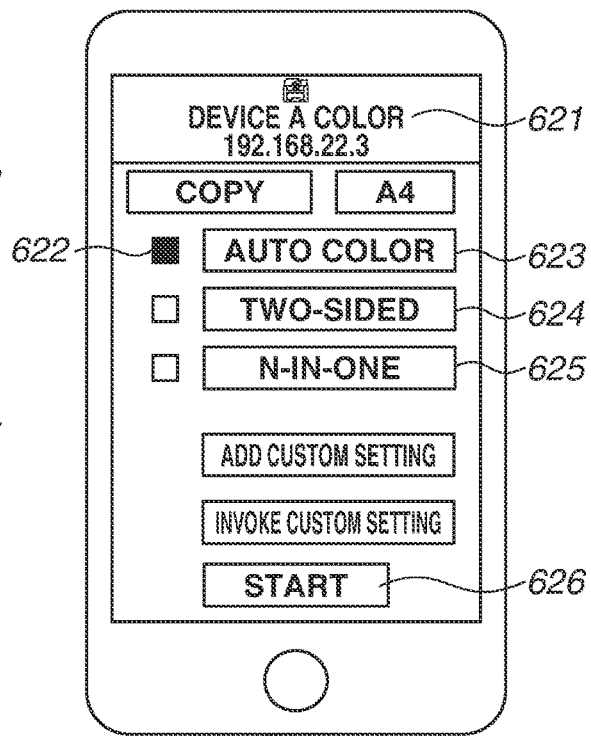
Figure 6C:
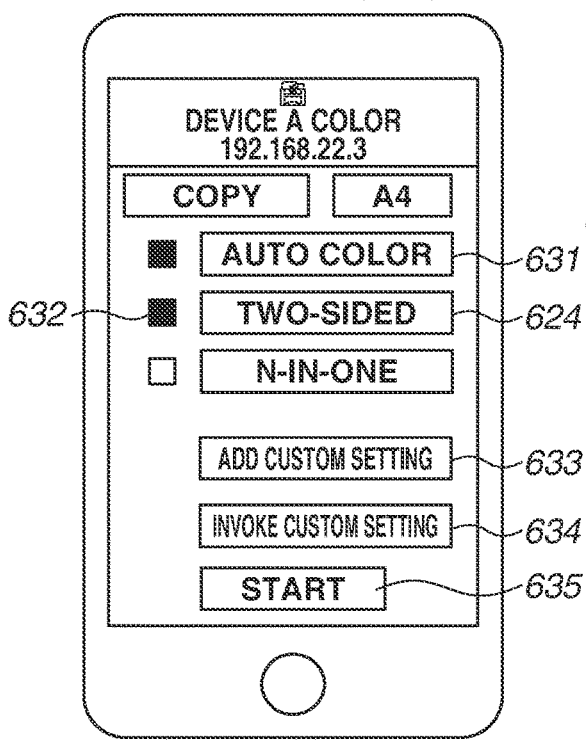
Figure 6D:
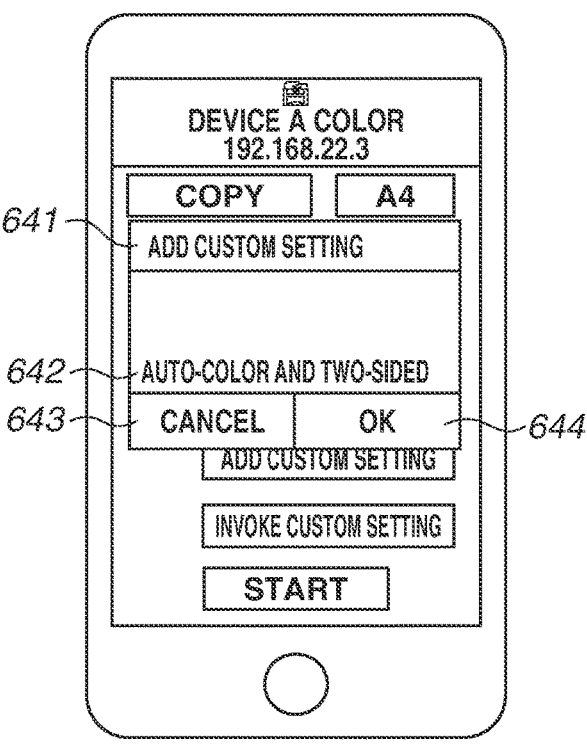

FIG. 6B is an initial screen for the copy function of the image forming apparatus 110 that is displayed at the press of the "COPY" button 614, as described above. The screen is controlled by a process illustrated in a flowchart in FIG. 7 which will be described below. At the press of a "Start" button 626, an instruction to execute copy processing is transmitted to the image forming apparatus 111 which is selected as a cooperation target and displayed in a selected image forming apparatus display region 621. In FIG. 6B, an "AUTO COLOR" state box 622 is changed to black, indicating that an "AUTO COLOR" setting button 623 is enabled, FIG. 6C is a screen that is displayed in a case where a "TWO-SIDED" setting button 624 is pressed by a user on the screen illustrated in FIG. 6B. A "TWO-SIDED" state box 632 is changed to black. At this time, if an "ADD CUSTOM SETTING" button 633 is pressed by a user, the application 301 changes the displayed screen to the screen illustrated in FIG. 6D and displays an "ADD CUSTOM SETTING" dialog 641. In a custom setting name input region 642, a custom setting name that is automatically generated from a setting that is enabled at the time of the press of the "ADD CUSTOM SETTING" button 633 (in the example illustrated in FIG. 6C, the "AUTO COLOR" and "TWO-SIDED" settings are enabled) is automatically displayed. The custom setting name is editable and can be changed to a user-desired name. If a "CANCEL" button 643 is pressed, the adding of the custom setting is cancelled. If an "OK" button 644 is pressed, the mobile terminal 100 additionally registers, as a custom setting, information about the setting that is enabled at the time of the press of the "ADD CUSTOM SETTING" button 633, and returns to the screen illustrated in FIG. 6C. Details of the processing will be described below with reference to the flowchart illustrated in FIG. 7.

Figure 6E:
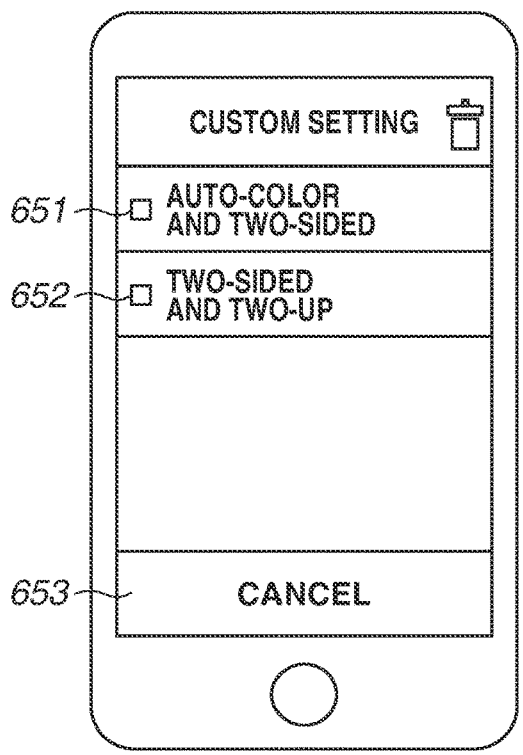
Figure 6F:
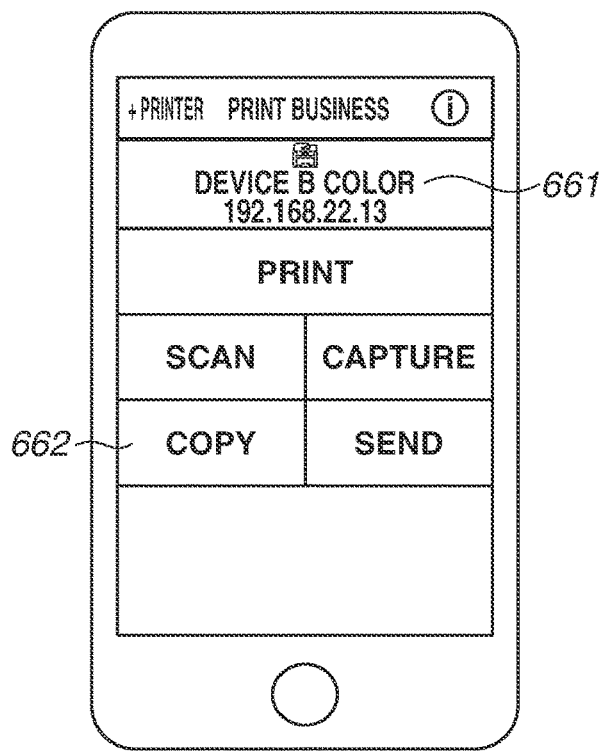

Further, if an "INVOKE CUSTOM SETTING" button 634 is pressed on the screen illustrated in FIG. 6B or 6C, the custom settings registered in the mobile terminal 100 (i.e., the custom settings stored in the flash memory 204 of the mobile terminal 100) are read, and a registered custom setting list screen is displayed as illustrated in FIG. 6E. Custom setting buttons 651 and 652 show a list of the names of the custom settings stored in the flash memory 204 of the mobile terminal 100. For example, if the custom setting button 651 is pressed, a screen on which the "AUTO COLOR" and "TWO-SIDED" settings are enabled as illustrated in FIG. 6C is displayed. Further, after a custom setting selected from the custom setting list is invoked, if a "Start" button 635 is pressed, the mobile terminal 100 instructs the image forming apparatus 110 to execute the copy function using the invoked custom setting.

Figure 6G:
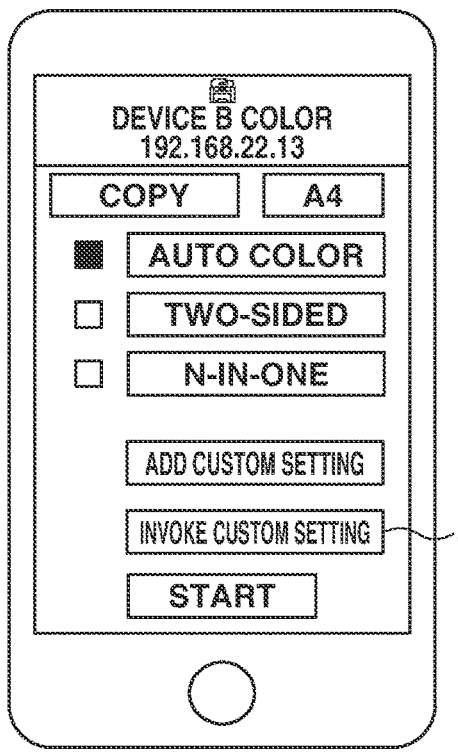
Figure 6H:
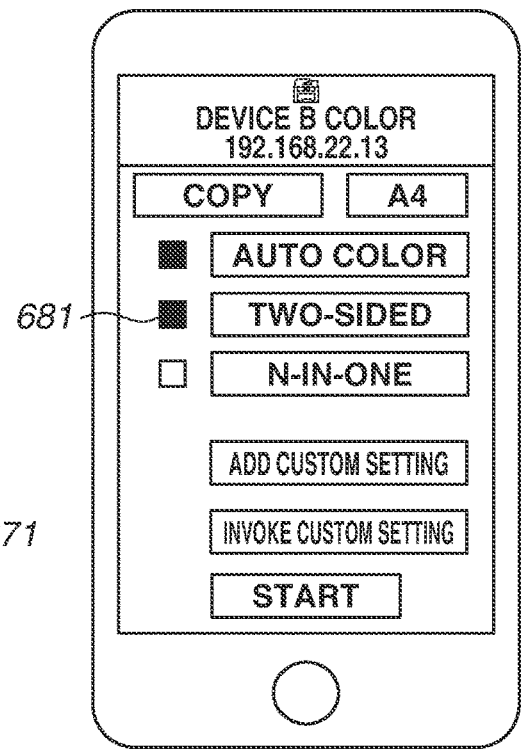
Figure 6I:
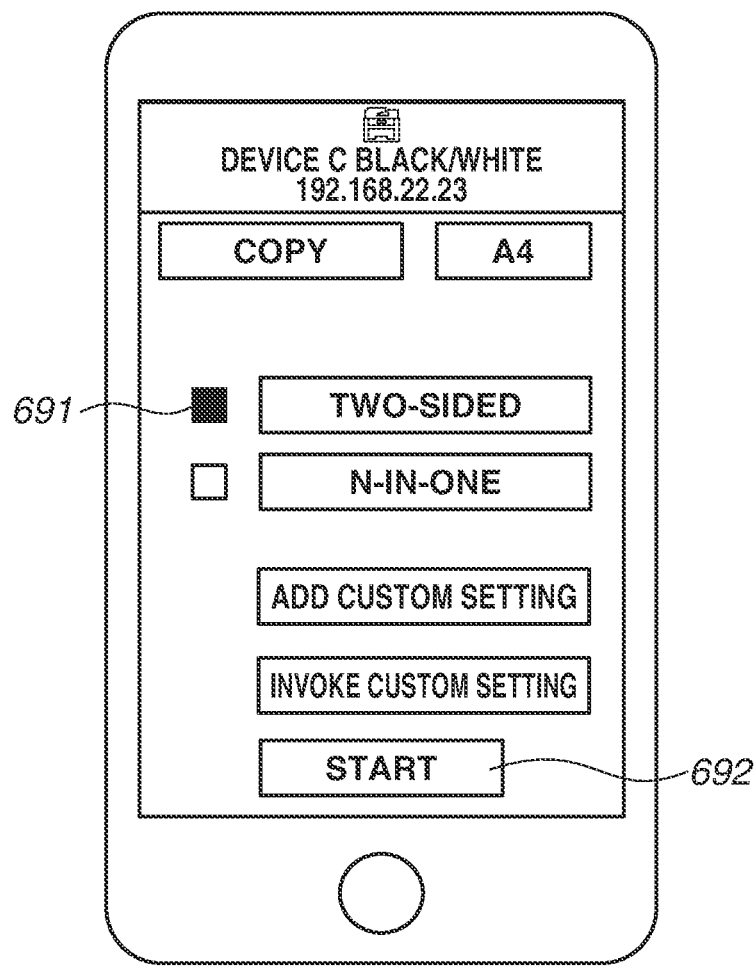

Further, there can be a case where the image forming apparatus 111 (DEVICE B COLOR) is selected as a cooperation target image forming apparatus as illustrated in FIG. 6F and a "COPY" button 662 is pressed. In this case, the mobile terminal 100 accesses the image forming apparatus 111 using the IP address (or URL) of the image forming apparatus HA that is displayed in a selected image forming apparatus display region 661, and receives a web page (HTML file) for configuring a setting of the copy function from the image forming apparatus 111. The mobile terminal 100 displays, based on the received web page, a screen (copy setting screen as illustrated in FIG. 6G) for configuring a setting of the copy function. If an "INVOKE CUSTOM SETTING" button 671 is pressed, the custom settings registered in the mobile terminal 100 (i.e., the custom settings stored in the flash memory 204 of the mobile terminal 100) are read, and a registered custom setting list screen is displayed as illustrated in FIG. 6E. Then, if, for example, the custom setting button 651 is pressed, the displayed screen is changed to a copy setting screen (screen illustrated in FIG. 6H) for the image forming apparatus 112 (DEVICE B COLOR) on which the "AUTO COLOR" and "TWO-SIDED" settings are enabled. On the screen illustrated in FIG. 6I1, a "TWO-SIDED" state box 681 is changed to black, and the "TWO-SIDED" setting is enabled, as apparent from a comparison with FIG. 6G. As described above, a setting designated on the copy screen for the image forming apparatus 110 (DEVICE A COLOR) is registered as a custom setting via the screens illustrated in FIGS. 6C and 6D, and the registered custom setting can be used on another image forming apparatus 111 (DEVICE B COLOR).

Further, similarly, after the image forming apparatus 112 (DEVICE C BLACK/WHITE) which supports only black/white printing is set as an operation target, if an "INVOKE CUSTOM SETTING" button is selected, a custom setting list screen is displayed as illustrated in FIG. 6E. On the list screen, if the "AUTO COLOR AND TWO-SIDED" custom setting button 651 is selected, a screen as illustrated in FIG. 61 is displayed. Specifically, since the image forming apparatus 112 does not include the color print function, the setting screen does not include "AUTO COLOR" as a selectable item, so that details of the invoked custom setting excluding "AUTO COLOR" are reflected. Thus, on the setting screen illustrated in FIG. 61, only a "TWO-SIDED" state box 691 is changed to black (enabled state). Then, in this state, if a "Start" button 692 is pressed, an instruction to execute the copy function based on the setting details as illustrated in FIG. 61 is issued to the image forming apparatus 112.

Figure 7:
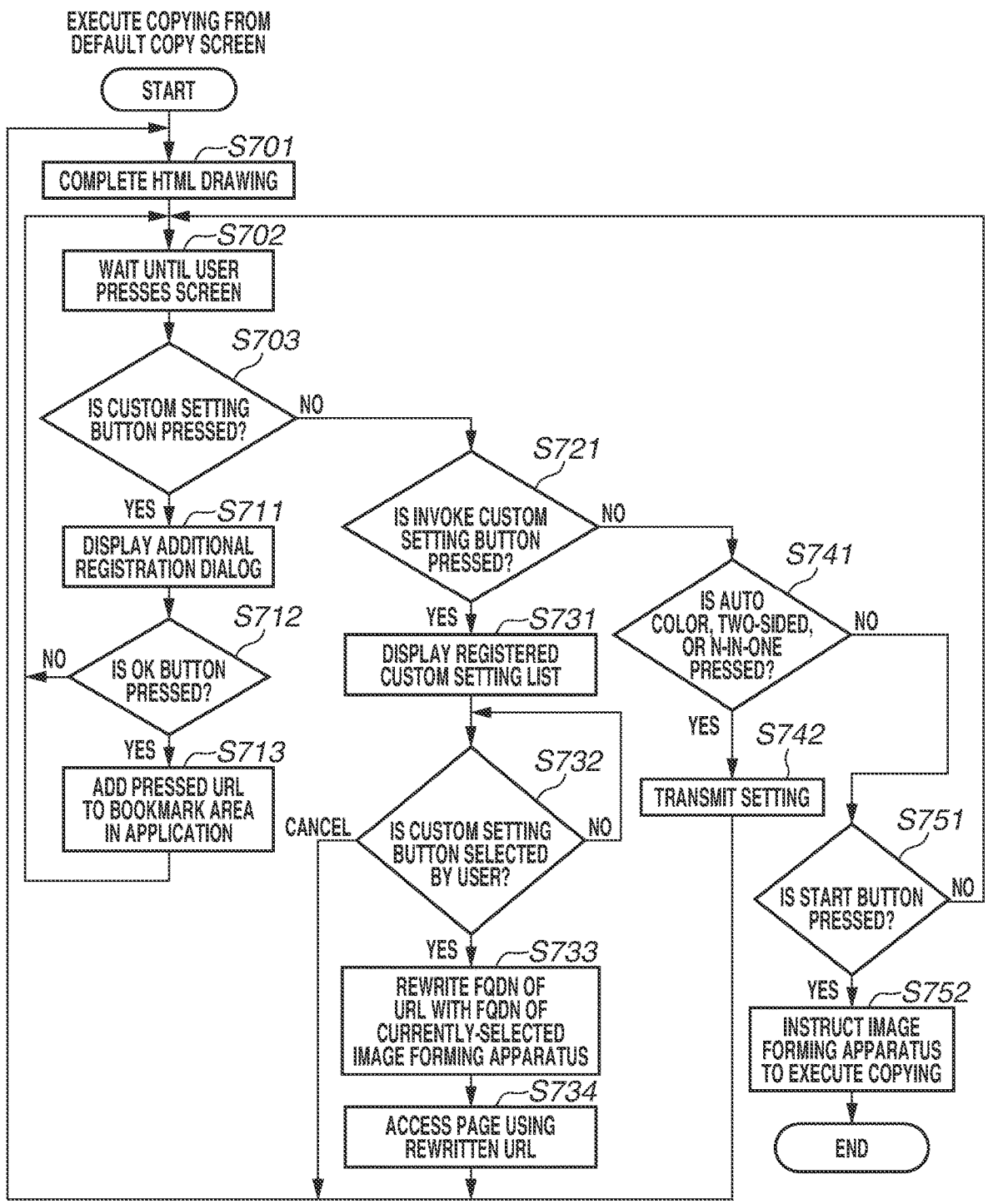
FIG. 7 is a flowchart illustrating details of a process (registering, invoking, and executing a custom setting) that is executed by the mobile terminal according to the first exemplary embodiment.

FIG. 7 is a flowchart illustrating details of a process (registering, invoking, and executing a custom setting) that is executed by the mobile terminal 100 according to the first exemplary embodiment. The CPU 201 of the mobile terminal 100 loads the control program (application 301) stored in a memory such as the ROM 202 onto the RAM 203 and executes the control program to thereby process each step illustrated in the flowchart in FIG. 7.

First, the CPU 201 activates the application 301 so that the basic screen as illustrated in FIG. 6A is displayed. A process in a case where an image forming apparatus is selected as a cooperation target based on a user operation and then one of the function buttons (copy, send, scan, and print buttons) is selected by a user on the basic screen will be described below. While a case where the "COPY" button 614 is selected is illustrated. As an example in FIG. 7, the process of registering, invoking, and executing a custom setting is similar to those in other cases in which the other functions are selected. If the "COPY" button 614 is pressed, the CPU 201 accesses the image forming apparatus being selected as a cooperation target using the IP address (URL) of the selected image forming apparatus, and receives HTML data (web page) generated by the selected image forming apparatus. Then, in step S701, the CPU 201 parses the received HTML data and draws a setting screen on the operation panel 205. Specifically, if the "COPY" button 614 is selected, the setting screen illustrated in FIG. 6B is displayed. The screens illustrated in FIGS. 6B, 6C, 6G, 6H, and 6I are screens displayed based on a web page (HTML data) received from the image forming apparatus.

Next, in step S702, the CPU 201 waits for a user operation on the operation panel 205. If a user presses the operation panel 205, the processing proceeds to step S703. At this time, if any of the buttons is pressed by the user, the URL embedded as a link in the pressed button is acquired.

In step S703, the CPU 201 determines whether the portion pressed on the operation panel 205 by the user is the "ADD CUSTOM SETTING" button 633.

The CPU 201 acquires the URL embedded in the pressed button and determines whether the acquired URL contains a predetermined text string (e.g., "MobileUI?func=") that indicates the "ADD CUSTOM SETTING" button. For example, in a case where the "ADD CUSTOM SETTING" button 633 is pressed in FIG. 6C, the URL acquired from the pressed button is as specified below. As described below in the description of steps S741 and S742, each time any of the setting buttons 623 to 625 is operated, the image forming apparatus generates a web page in which the URL embedded in the "ADD CUSTOM SETTING" button is changed, and transmits the generated web page to the mobile terminal 100.
https://192.168.22.3/
    MobileUI?func=copy&size=A4&2side=yes&Color=
    Auto&Name=AutoColor&TwoSided Hereinafter, the portion after "http://" and before the slash (in the above-described example, the portion of the IP address (192.168.22.3) of the image forming apparatus) will be referred to as "FQDN". Further, the portion after "?" in the URL will be referred to as "URL parameter" hereinafter. The portion "func=" of the URL parameter specifies a function name, and "copy" or "scan" is inserted. The portion "size=" of the URL parameter specifies a sheet size, and in the above-described example, A4 size is specified. The portion "2side=" of the URL parameter specifies a two-sided printing setting. The portion "Color=" of the URL parameter specifies whether the color machine is to execute color printing or black/white printing. The portion "Name=" at the end of the URL parameter is a text string that is used in custom setting registration, which will separately be described. The descriptions of the URL parameter portions can be any other descriptions. If the CPU 201 determines that the acquired URL contains "MobileUI?func=" (YES in step S703), i.e., if the CPU 201 determines that the "ADD CUSTOM SETTING" button is pressed, the processing proceeds to step S711. On the other hand, if the CPU 201 determines that the acquired URL does not contain "MobileUI?func=" (NO in step S703), the processing proceeds to step S721.

In step S711, the CPU 201 displays an additional registration dialog on the operation panel 205. Specifically, the "ADD CUSTOM SETTING" dialog 641 illustrated in FIG. 6D is displayed. An initial text string of the custom setting name input region 642 in FIG. 6D is automatically generated from the portion "Name=" of the URL parameter. As described above with reference to FIG. 6D, the custom setting name input region 642 is editable by a user.

In step S712, if the "ADD CUSTOM SETTING" dialog 641 is closed and the "OK" button 644 is pressed (YES in step S712), the processing proceeds to step S713. On the other hand, if the "CANCEL" button 643 is pressed (NO in step S712), the processing returns to step S702.

In step S713, the CPU 201 additionally stores the URL acquired from the "ADD CUSTOM SETTING" button 633 in a bookmark area of the flash memory 204 together with the custom setting name (in the example illustrated in FIG. 6D, "AUTO COLOR AND TWO-SIDED") set to the custom setting name input region 642. Then, the processing returns to step S702.

Further, in step S721, the CPU 201 determines whether the "INVOKE CUSTOM SETTING" button 634 is pressed. As in step S703, the CPU 201 determines whether the URL acquired from the pressed button contains a text string (e.g., "MobileUI?exec=") that indicates the "INVOKE CUSTOM SETTING" button 634. If the CPU 201 determines that the "INVOKE CUSTOM SETTING" button 634 is pressed (YES in step S721), the processing proceeds to step S731. On the other hand, if the pressed button is a button other than the "INVOKE CUSTOM SETTING" button 634 (NO in step S721), the processing proceeds to step S741.

In step S731, the CPU 201 reads the custom settings registered in the flash memory 204 and displays a registered custom setting list on the operation panel 205. FIG. 6E illustrates a display example of a registered custom setting list screen. Next, in step S732, the CPU 201 determines a user input to the operation panel 205. If the CPU 201 determines that a "CANCEL" button 653 is pressed (CANCEL in step S732), a custom setting selection screen illustrated in FIG. 6E is closed, and the processing returns to step S701. On the other hand, if the CPU 201 determines that one of the custom setting buttons 651 and 652 is selected (YES in step S732), the processing proceeds to step S733.

In step S733, the CPU 201 reads the URL corresponding to the custom setting selected by the user in step S732 from the bookmark area of the flash memory 204 and rewrites the FQDN of the read URL with the FQDN of the image forming apparatus selected as a cooperation target by the application 301 and generates a new URL. An image forming apparatus that is different from the image forming apparatus at the time of storing the custom setting in step S713 can be selected as the cooperation target image forming apparatus. For example, as in FIG. 6F, if the image forming apparatus 111 is selected as a cooperation target and then the "COPY" button 662 is pressed on the activation screen, the screen illustrated in FIG. 6G is displayed. In a case where the "INVOKE CUSTOM SETTING" button 671 is pressed thereafter and the custom setting selection screen in FIG. 6E is displayed, the FQDN (IP address) of the image forming apparatus 111 selected as a cooperation target is "192.168.22.13", In this case, the URL corresponding to the custom setting selected by the user in step S732 is rewritten with the FQDN of the image forming apparatus 111 selected as a cooperation target as follows.
https://192.168.22.13/
MobileUI?func=copy&size=A4&2side=yes&Color?Auto&Name=AutoColor&TwoSided The generated URL is used as information for requesting the image forming apparatus selected as a cooperation target to apply the custom setting read from the memory based on the user selection operation.

In step S734, the CPU 201 accesses the image forming apparatus 111 using the URL rewritten in step S733, acquires a web page generated by the image forming apparatus 111, and draws the acquired web page in step S701.

In step S741, the CPU 201 determines, on a browser, whether a setting button such as the "AUTO COLOR" setting button 623, the "TWO-SIDED" setting button 624, or the "N-IN-ONE" setting button 625 is pressed. In each setting button, a URL for changing the setting details of the setting button is embedded, and whether a pressed button is a setting button is determined based on a URL acquired when the button is pressed. If the CPU 201 determines that a setting button is pressed (YES in step S741), the processing proceeds to step S742. On the other hand, if the CPU 201 determines that a button other than the setting buttons is pressed (NC) in step S741), the processing proceeds to step S751.

In step S742, the CPU 201 accesses the image forming apparatus selected as a cooperation target using the URL acquired in step S741 to thereby transmit the changed setting details and acquires a web page regarding a setting screen reflecting the changed setting from the image forming apparatus, and the processing returns to step S701.

In step S751, the CPU 201 determines whether the "Start" button is pressed. In the "Start" button, a URL for requesting the image forming apparatus being selected as a cooperation target to start copy processing according to the setting details set on the setting screen is embedded, and the CPU 201 can determine whether the "Start" button is pressed based on the embedded URL. If the CPU 201 determines that the "Start" button is pressed (YES in step S751), the processing proceeds to step S752. Otherwise (NO in step S751), the processing returns to step S702.

In step S752, the CPU 201 instructs the image forming apparatus to execute copying using the URL acquired in step S751.

Figure 8:
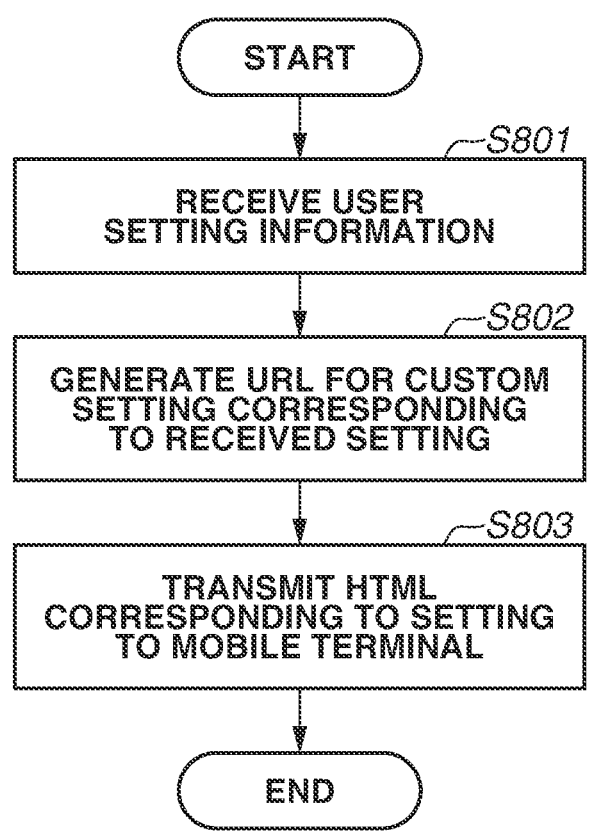
FIG. 8 is a flowchart illustrating a process of generating a custom setting uniform resource locator (URL) that is executed by an image forming apparatus according to the first exemplary embodiment.

FIG. 8 is a flowchart illustrating a process executed at the time of generating a custom setting URL by the UI function unit 506 of the image forming apparatus. The CPU 411 of the image forming apparatus loads the control program stored in the memory 416 onto the RAM 412 and executes the control program to thereby process each step illustrated in the flowchart in FIG. 8.

First, in step S801, the CPU 411 receives setting information from the mobile terminal 100. The received setting information is setting information that is transmitted from the mobile terminal 100 in step S742 in FIG. 7 if the "AUTO COLOR" setting button 623, the "TWO-SIDED" setting button 624, or the "N-1N-ONE" setting button 625 is pressed by a user and the setting is changed while the mobile terminal 100 displays the screen illustrated in FIG. 6B or 6C on the operation panel 205.

Next, in step S802, the CPU 411 generates a URL for a custom setting corresponding to the setting received in step S801.

For example, if the "TWO-SIDED" setting button 624 is pressed on the screen illustrated in FIG. 6B, setting information about a state in which the two-sided setting is changed to "ON" is transmitted from the mobile terminal 100, so that the CPU 411 of the image forming apparatus generates a URL as specified below based on the received setting information.

https://192.1.68.22.3/
  MobileUI?func=copy&size=A4&2side=yes&Color=Auto&Name=AutoColor&TwoSided Then, in step S803, the CPU 411 generates a web page (HTML data) of a setting screen (screen illustrated in FIG. 6C) in which the URL generated in step S802 is embedded in the "ADD CUSTOM SETTING" button 633, and transmits the generated HTML data to the mobile terminal 100.

While the process in which the CPU 201 of the mobile terminal 100 transmits setting information to the image forming apparatus in step S742 each time a user presses any of the setting buttons (623 to 625) on the mobile terminal 100 is illustrated in the flowchart in FIG. 7, the process is not limited to that described above. For example, in another method, if any of the setting buttons (623 to 625) is pressed by a user, a JavaScript® for dynamically generating a URL to be embedded in the "ADD CUSTOM SETTING" button 633 on the mobile terminal 100 is described in a web page (HTML data), and a browser of the application 301 of the mobile terminal 100 executes the JavaScript. In this case, if the CPU 201 determines that the pressed button is a setting button in step S741, instead of transmitting the changed setting information in step S742, the CPU 201 generates a URL based on the pressed setting button according to the description of the JavaScript and associates the generated URL with the "ADD CUSTOM SETTING" button 633.

Figure 9:
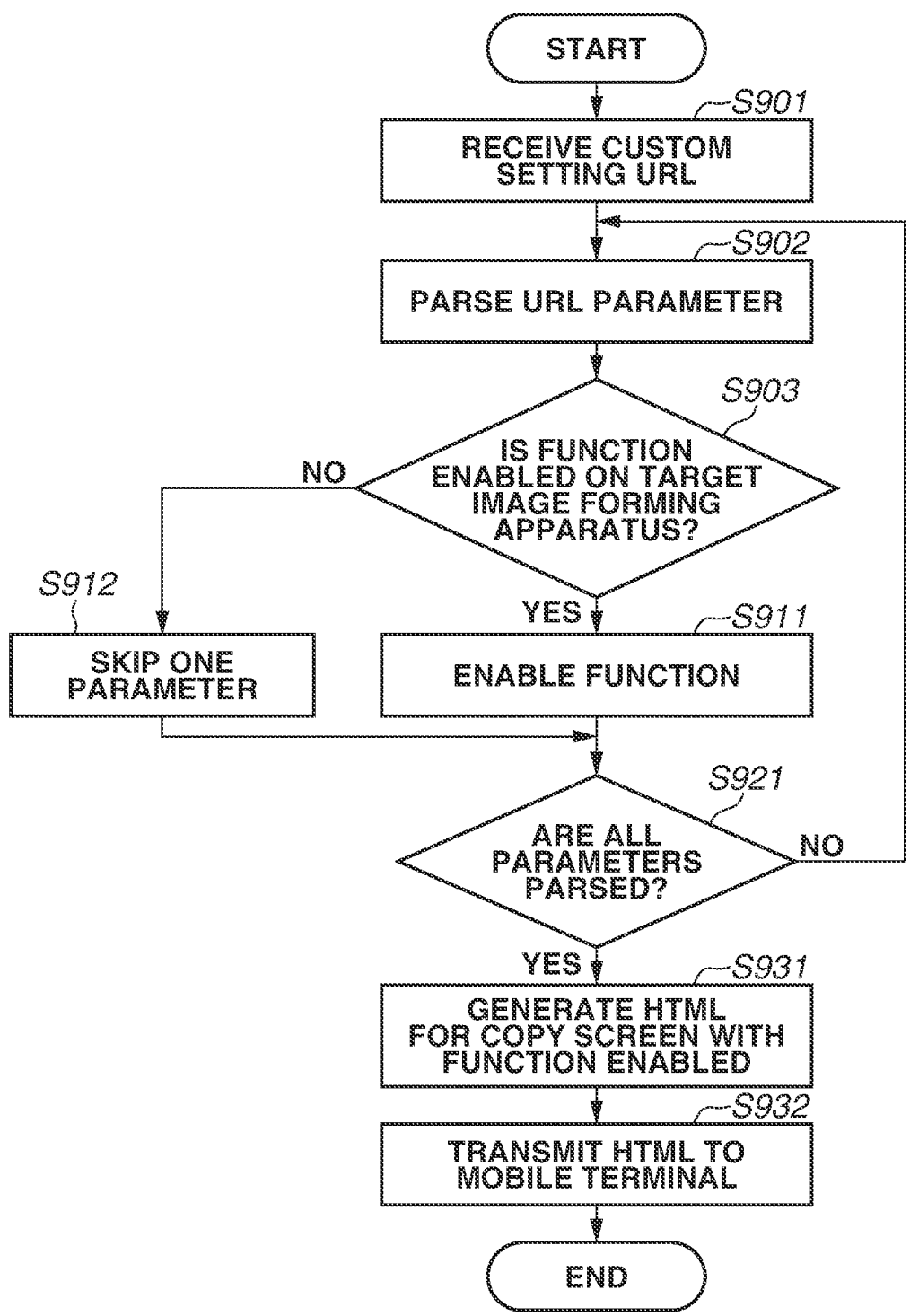
FIG. 9 is a flowchart illustrating a process of receiving a custom setting URL that is executed by the image forming apparatus according to the first exemplary embodiment.

FIG. 9 is a flowchart illustrating a process in which the UI function unit 506 of the image forming apparatus parses a custom setting URL received from the mobile terminal 100 and generates a web page in a case where the "INVOKE CUSTOM SETTING" button is pressed on the mobile terminal 100 and a registered custom setting is selected by a user. The CPU 411 loads the control program stored in the memory 416 onto the RAM 412 and executes the control program to thereby process each step illustrated in the flowchart in FIG. 9.

First, in step S901, the CPU 411 of the image forming apparatus receives a custom setting URL transmitted from the mobile terminal 100. The custom setting URL is a URL that is transmitted from the mobile terminal 100 in step S734 in FIG. 7 in a case where one of the custom setting buttons 651 and 652 is pressed on the custom setting selection screen illustrated in FIG. 6E on the mobile terminal 100.

Next, in step S902, the CPU 411 parses the URL parameter of the URL received in step S901 and extracts one unprocessed parameter from a plurality of setting item parameters contained in the URL parameter.

In step S903, the CPU 411 determines whether each setting parsed in step S902 is a function that is enabled on the image forming apparatus. For example, in the case of the image forming apparatus 112 which does not include the color print function, the parameter "Color=" of the color setting is irrelevant (i.e., the setting is disabled) (NO in step S903), the CPU 411 ignores (skips) the parameter in step S912, and the processing proceeds to step S921. On the other hand, if the extracted parameter is an enabled function (e.g., if the parameter "2side" which indicates the two-sided print setting is enabled) (YES in step S903), the processing proceeds to step S911.

In step S911, since the extracted parameter is a setting that is enabled on the image forming apparatus, the CPU 411 enables the setting, and the processing proceeds to step S921.

In step S921, the CPU 411 determines whether all of the plurality of setting item parameters contained in the URL parameter are processed. If all of the plurality of setting item parameters are processed (YES in step S921), the processing proceeds to step S931. On the other hand, if there remains an unprocessed setting item parameter (NO in step S921), the processing returns to step S902, and the unprocessed setting item parameter is processed.

In step S931, the CPU 411 generates a web page (HTML data) of a copy screen with the setting enabled in step S911.

In step S932, the CPU 411 transmits the HTML data generated in step S931 to the mobile terminal 100.

By the method described above, the mobile terminal 100 can store a custom setting simply using a URL which is a text string, and it is not necessary to pay special attention to details of the functions of the image forming apparatus, and a previous custom setting is reusable by another image forming apparatus having a different function by simply rewriting the FQDN portion. Further, since custom setting information is stored on the mobile terminal 100 side, even if image forming apparatuses are not set to share a custom setting via a server, a user can use the custom setting by simply carrying around the mobile terminal 100.

Further, in the case of displaying a web page of a setting screen provided by an image forming apparatus, the application 301 of the mobile terminal 100 can easily acquire the URL, based on a user operation using only a basic application programming interface (API) of Web View, which is an OS-provided HTML drawing engine.

Further, while the copy operation is described in the above-described exemplary embodiment, another custom setting region for the send function can be prepared in the flash memory 204 of the mobile terminal 100, and a bookmark storage region can be provided for each function.

According to the first exemplary embodiment, an image forming apparatus describes a parameter relating to a user-designated setting in a URL and provides the URL to the mobile terminal 100 so that the URL is easily stored in the mobile terminal 100. The mobile terminal 100 can store the URL as a custom setting and reuse the stored URL with ease.

In the first exemplary embodiment, the method in which a custom setting is described in a URL parameter and the mobile terminal 100 and the image forming apparatuses 110, 111, and 112 cooperate is described. In a second exemplary embodiment, a cooperation method will be described in which a custom setting is described in a cookie of HTTP communication instead of a URL, parameter.

The configurations of the mobile terminal 100 and the image forming apparatuses 110, 111, and 112 are similar to those in the first exemplary embodiment illustrated in FIGS. 2 to 5, so that description thereof is omitted.

In the present exemplary embodiment, for example, a cookie in a format specified below is used. In reality, however, since only a text string is allowed according to cookie specifications, the below-specified text string is stored in the cookie using URL encoding.

CustomSetting=func=copy&size=A4&2side=yes&Color=
Auto&Name=AutoColor&TwoSided"

Furthermore, the flowcharts illustrated in FIGS. 7, 8, and 9 according to the first exemplary embodiment are changed as follows.

In step S713 in FIG. 7, the CPU 201 adds the above-specified cookie value to the bookmark area of the flash memory 204 instead of the processing of adding the URL to the bookmark.

Further, instead of the processing of steps S733 and S734 in FIG. 7, the CPU 201 reads cookie information about the custom setting registered in the flash memory 204 and uses the read cookie information when accessing the image forming apparatus selected as a cooperation target using a URL for reflecting the custom setting of the selected image forming apparatus.

For example, the CTRL for reflecting the custom setting is described in the below-specified format.
https://192.168.22.3/MobileUI/Custom-Setting Further, while the custom setting URL is generated in FIG. 8 in the first exemplary embodiment, the CPU 411 generates a custom setting cookie in step S802 and transmits HTML data including the generated custom setting cookie to the mobile terminal 100 in step S803 in the second exemplary embodiment.

Further, while the custom setting URL is received and parsed in step S902 in FIG. 9 in the first exemplary embodiment, the CPU 411 parses the custom setting cookie transmitted from the mobile terminal 100 in step S902 in the second exemplary embodiment.

The above-described method using the cookie also permits a custom setting to be stored in the mobile terminal 100 and reused with ease.

In a third exemplary embodiment, a cooperation method will be described in which a custom setting is described in JavaScript Object Notation (JSON) or Extensible Markup Language (XML) format in HTML data instead of the URL parameter. Specifically, a custom setting is described in JSON format in HTML, data in a format as illustrated in FIG. 10.

Furthermore, the flowcharts illustrated in FIGS. 7, 8, and 9 according to the first exemplary embodiment are changed as follows.

Prior to the processing of displaying the registration dialog in step S711 in FIG. 7, the CPU 201 parses the content of the HTML data and acquires the JSON value of the current custom setting, as additional processing. Further, in step S713 in FIG. 7, the CPU 201 adds the parsed and acquired JSON value to the bookmark area of the flash memory 204 instead of the processing of adding the URL to the bookmark.

Further, instead of the processing of steps S733 and S734 in FIG. 7, the CPU 201 reads the JSON value of the custom setting registered in the flash memory 204 and transmits the read JSON value using POST, which is an HTML transmission method, when accessing the image forming apparatus selected as a cooperation target using the URL for reflecting the custom setting of the selected image forming apparatus.

For example, the URL for reflecting the custom setting is described in the below-specified format.
https://192.168.22.3/MobileUI/Custom-JSON Further, while the custom setting URL is generated in FIG. 8 in the first exemplary embodiment, the CPU 411 generates the custom setting JSON value in step S802 and adds the generated JSON value to HTML data and transmits the HTML data with the JSON value to the mobile terminal 100 in step S803 in the third exemplary embodiment.

Further, while the custom setting URL is received and parsed in step S902 in FIG. 9 in the first exemplary embodiment, the CPU 411 parses the custom setting JSON value transmitted from the mobile terminal 100 in step S902 in the third exemplary embodiment.

The above-described method in which the JSON value is stored in the HTML data also permits a custom setting to be stored in the mobile terminal 100 and reused with ease.

According to the first to third exemplary embodiments described above, use of a terminal apparatus capable of displaying a web page allows a plurality of image forming apparatuses to share a custom setting with ease.

While the image forming apparatus (multi-function peripheral) that includes the print function and the scanner function is used as a cooperation target of a terminal in the first to third exemplary embodiments described above, the cooperation target is not limited to multi-function peripherals, and any apparatus (information processing apparatus) that includes a predetermined function can be used.

Embodiment(s) of the present disclosure can also be realized by a computer of a system or apparatus that reads out and executes computer executable instructions one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-196233, filed Oct. 17, 2018, which is hereby incorporated by reference herein in its entirety.

What is claimed is:

1. A system comprising devices that include an image forming apparatus and a terminal,
    wherein the image forming apparatus comprises:
        a first memory; and
        at least one processor in communication with the first memory, wherein the at least one processor of the image forming apparatus is configured to perform:
            providing the terminal with a first web page for inputting a setting for print processing;

providing, in response to reception of a request based on an input of the setting by a user via the first web page displayed on the terminal, the terminal with a web page on which the input setting is reflected, wherein the web page provided is a web page that differs depending on the setting input on the first web page; and executing the print processing based on the input setting in response to reception of a request based on an input by the user via the web page on which the input setting is reflected and displayed on the terminal, wherein the terminal comprises:
a second memory; and
at least one processor in communication with the second memory, wherein the at least one processor of the terminal is configured to perform:
displaying the provided first web page;
requesting, by using uniform resource locator (URL) information from the image forming apparatus, the web page on which the input setting is reflected in response to receiving the setting input by the user via the displayed first web page, wherein the URL contains at least setting value information corresponding to the input setting and destination information indicating a requestee to which the request is made, and wherein the web page is requested using a URL that contains different setting value information when a different setting is input;
displaying the provided web page on which the input setting is reflected;
requesting the image forming apparatus to print using the input setting, in response to receiving the input by the user via the displayed web page on which the input setting is reflected;
storing the URL information to be used to request the web page on which the input setting is reflected;
requesting, using the stored URL information, the web page on which the input setting is reflected from the image forming apparatus;
generating a new URL when requesting a web page on which the input setting is reflected from another image forming apparatus, wherein the new URL is generated by using the setting value information contained in the stored URL as a common setting value information and by overwriting the destination information contained in the stored URL with destination information of the another image forming apparatus;
requesting, using the generated URL, the web page on which the input setting is reflected from the another image forming apparatus; and
requesting the another image forming apparatus to print using the input setting, in response to receiving input by the user via the displayed the web page on which the input setting is reflected.

2. The information processing system according to claim 1, wherein, in a case where the terminal requests the web page from the another image forming apparatus using the generated URL, the web page is provided by the another image forming apparatus.

3. The information processing system according to claim 1, wherein when requesting the web page on which the input setting is reflected from the another image forming apparatus, an IP address of the image forming apparatus included in the URL is replaced with an IP address of the another image forming apparatus.

4. The information processing system according to claim 1,
wherein a plurality of buttons corresponding to a plurality of print settings respectively is displayed on the first web page, and
wherein a URL for making a request for a web page on which the corresponding print setting is reflected is embedded in each of the plurality of buttons.

5. The information processing system according to claim 1, wherein the web page on which the input setting is reflected includes a first button for executing the print processing based on the input setting and a second button for storing the URL information to be used for making a request for the web page on which the input setting is reflected.

6. The information processing system according to claim 5, wherein the URL information is stored into the terminal when the second button is pressed.

7. The information processing system according to claim 1,
wherein the terminal requests for a web page by using a second URL in a case where the setting received on the displayed first web page is a second setting, and
wherein the terminal requests for a third web page by using a third URL in a case where the setting received on the first web page is a third setting.

8. The information processing system according to claim 1, wherein the terminal requests for a different web page by using a different URL each time a setting is received on the displayed web page.

9. The information processing system according to claim 1, wherein the URL contains a string of characters indicating the input setting.

10. The information processing system according to claim 1, wherein, when executing the print processing based on the input setting, the image forming apparatus executes the print processing based on a setting that is valid on the image forming apparatus only.

11. A method to be performed between an image forming apparatus and a terminal, the method comprising:
providing the terminal with a first web page for inputting a setting for print processing;
displaying, by the terminal, the provided first web page;
requesting, by using uniform resource locator (URL) information from the image forming apparatus, a web page on which the setting is reflected in response to receiving the setting input by the user via the displayed first web page wherein the URL contains at least setting value information corresponding to the input setting and destination information indicating a requestee to which the request is made, and wherein the web page is requested using a URL that contains different setting value information when a different setting is input;
providing, in response to reception of a request based on an input of the setting by a user via the first web page displayed on the terminal, the terminal with the web page on which the input setting is reflected, wherein the web page provided is a web page that differs depending on the setting input on the first web page;
displaying, by the terminal, the provided web page on which the input setting is reflected;
requesting, by the terminal, the image forming apparatus to print using the input setting, in response to receiving the input by the user via the displayed web page on which the input setting is reflected;

executing, by the image forming apparatus, the print processing based on the input setting in response to reception of a request based on the input by the user via the web page on which the input setting is reflected and displayed on the terminal;

storing, by the terminal, the URL information to be used to request the web page on which the input setting is reflected;

requesting, using the stored URL information, the web page on which the input setting is reflected from the image forming apparatus;

generating a new URL when requesting a web page on which the input setting is reflected from another image forming apparatus, wherein the new URL is generated by using the setting value information contained in the stored URL as a common setting value information and by overwriting the destination information contained in the stored URL with destination information of the another image forming apparatus;

requesting, using the generated URL, the web page on which the input setting is reflected from the another image forming apparatus; and requesting, by the terminal, the another image forming apparatus to print using the input setting, in response to receiving input by the user via the displayed the web page on which the input setting is reflected.

12. A non-transitory computer-readable storage medium storing a program to cause a computer to perform a method for an image forming apparatus and a terminal, the method comprising:

providing the terminal with a first web page for inputting a setting for print processing;

displaying, by the terminal, the provided first web page;

requesting, by using uniform resource locator (URL) information from the image forming apparatus, a web page on which the setting is reflected in response to receiving the setting input by the user via the displayed first web page wherein the URL contains at least setting value information corresponding to the input setting and destination information indicating a requestee to which the request is made, and wherein the web page is requested using a URL that contains different setting value information when a different setting is input;

providing, in response to reception of a request based on an input of the setting by a user via the first web page displayed on the terminal, the terminal with the web page on which the input setting is reflected, wherein the web page provided is a web page that differs depending on the setting input on the first web page;

displaying, by the terminal, the provided web page on which the input setting is reflected;

requesting, by the terminal, the image forming apparatus to print using the input setting, in response to receiving the input by the user via the displayed web page on which the input setting is reflected;

executing, by the image forming apparatus, the print processing based on the input setting in response to reception of a request based on the input by the user via the web page on which the input setting is reflected and displayed on the terminal;

storing, by the terminal, the URL information to be used to request the web page on which the input setting is reflected;

requesting, using the stored URL information, the web page on which the input setting is reflected from the image forming apparatus;

generating a new URL when requesting a web page on which the input setting is reflected from another image forming apparatus, wherein the new URL is generated by using the setting value information contained in the stored URL as a common setting value information and by overwriting the destination information contained in the stored URL with destination information of the another image forming apparatus;

requesting, using the generated URL, the web page on which the input setting is reflected from the another image forming apparatus; and requesting, by the terminal, the another image forming apparatus to print using the input setting, in response to receiving input by the user via the displayed the web page on which the input setting is reflected.

* * * * *